(12) United States Patent  
Li et al.

(10) Patent No.: US 12,333,810 B2
(45) Date of Patent: Jun. 17, 2025

(54) OBJECT DETECTION

(71) Applicant: Telefonaktiebolaget LM Ericsson (publ), Stockholm (SE)

(72) Inventors: Yun Li, Lund (SE); Alexander Hunt, Tygelsjö (SE); Hector Caltenco, Oxie (SE); Saeed Bastani, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 407 days.

(21) Appl. No.: 17/761,482

(22) PCT Filed: Oct. 2, 2019

(86) PCT No.: PCT/EP2019/076765
§ 371 (c)(1),
(2) Date: Mar. 17, 2022

(87) PCT Pub. No.: WO2021/063505
PCT Pub. Date: Apr. 8, 2021

(65) Prior Publication Data
US 2022/0366691 A1    Nov. 17, 2022

(51) Int. Cl.
*G06V 20/40* (2022.01)
*G06T 7/20* (2017.01)
(Continued)

(52) U.S. Cl.
CPC ............ *G06V 20/46* (2022.01); *G06T 7/20* (2013.01); *G06V 10/82* (2022.01); *H04N 23/65* (2023.01)

(58) Field of Classification Search
CPC ........ G06V 20/46; G06V 10/82; H04N 23/65; G06T 7/20
See application file for complete search history.

(56) References Cited

U.S. PATENT DOCUMENTS

2002/0181799 A1* 12/2002 Matsugu ............... G06V 10/94
382/260
2005/0195383 A1* 9/2005 Breed ..................... G01S 7/481
356/28
(Continued)

FOREIGN PATENT DOCUMENTS

CN    1604125 A    4/2005
CN    106803263 A    6/2017
(Continued)

OTHER PUBLICATIONS

International Search Report and Written Opinion dated Jun. 24, 2020 for International Application No. PCT/EP2019/076765 filed Oct. 2, 2019, consisting of 9-pages.
J.F. Henriques et al.; High-Speed Tracking with Kernelized Correlation Filters; IEEE Transactions on Pattern Analysis and Machine Intelligence, vol. 37, No. 3, Mar. 2015, consisting of 14-pages.
(Continued)

*Primary Examiner* — Qun Shen
(74) *Attorney, Agent, or Firm* — Weisberg I.P. Law, P.A.

(57) ABSTRACT

A method of detecting objects in a video includes, for each image in the video, determining a degree of correlation between the image and at least one preceding image in a sequence of images; and obtaining a first measure of energy consumption required for performing an object detection process on the image, obtaining a second measure of energy consumption required for performing an object tracking process for tracking at least one object from a previous image, and comparing the first and second measures of energy. The object detection process is performed on the image if either said degree of correlation is below a threshold level or said first measure of energy is lower than the second measure of energy, and otherwise the object tracking process is performed on the image.

21 Claims, 3 Drawing Sheets

(51) Int. Cl.
    *G06V 10/82*      (2022.01)
    *H04N 23/65*      (2023.01)

(56) References Cited

U.S. PATENT DOCUMENTS

| | | |
|---|---|---|
| 2005/0265581 A1 | 12/2005 | Porter et al. |
| 2008/0040004 A1* | 2/2008 | Breed ................. G01S 7/023 |
| | | 701/45 |
| 2010/0296701 A1 | 11/2010 | Hu |
| 2015/0055821 A1* | 2/2015 | Fotland ............. G06V 10/255 |
| | | 382/103 |
| 2015/0125032 A1* | 5/2015 | Yamanaka ........... G06V 40/103 |
| | | 382/103 |
| 2017/0357889 A1* | 12/2017 | Zhang .................. G06N 3/088 |
| 2018/0137632 A1* | 5/2018 | Takada ............... G06V 30/248 |
| 2018/0349191 A1* | 12/2018 | Dorsey ............... G06F 9/3851 |
| 2019/0087661 A1* | 3/2019 | Lee ...................... G06V 10/82 |
| 2019/0213420 A1* | 7/2019 | Karyodisa ........... G06V 20/41 |

FOREIGN PATENT DOCUMENTS

| | | |
|---|---|---|
| CN | 108986143 A | 12/2018 |
| CN | 109727271 A | 5/2019 |
| WO | 2018020275 A1 | 2/2018 |

OTHER PUBLICATIONS

Hao Luo et al.; Detect or Track: Towards Cost-Effective Video Object Detection/Tracking; Proceedings of the AAAI Conference on Artificial Intelligence; Jul. 17, 2019, consisting of 8-pages.

Yuan Li et al.; Tracking in Low Frame Rate Video: A Cascade Particle Filter with Discriminative Observers of Different Life Spans; IEEE Transactions on Pattern Analysis and Machine Intelligence, vol. 30, No. 10, Oct. 2008, consisting of 13-pages.

Michael D. Breitenstein et al.; Online Multiperson Tracking-by-Detection from a Single, Uncalibrated Camera; IEEE Transactions on Pattern Analysis and Machine Intelligence, vol. 33, No. 9, Sep. 2011, consisting of 14-pages.

Zia Khan et al.; MCMC-Based Particle Filtering for Tracking a Variable Number of Interacting Targets; IEEE Transactions on Pattern Analysis and Machine Intelligence, vol. 27, No. 11, Nov. 2005, consisting of 15-pages.

Elie Moussy et al.; A Comparative View on Exemplar 'Tracking-by-Detection' Approaches; IEEE International Conference on Advanced Video and Signal-based Surveillance (AVSS), Aug. 2015, consisting of 7-pages.

Chinese Office Action with English machine translation dated Nov. 30, 2024 for Patent Application No. 201980101126.9, consisting of 18 pages.

* cited by examiner

OBJECT DETECTION

CROSS-REFERENCE TO RELATED APPLICATION

This application is a Submission Under 35 U.S.C. § 371 for U.S. National Stage Patent Application of International Application Number: PCT/EP2019/076765, filed Oct. 2, 2019 entitled "OBJECT DETECTION," the entirety of which is incorporated herein by reference.

TECHNICAL FIELD

This relates to object detection, and in particular to the detection of objects in video images.

BACKGROUND

It is known to use a Convolutional Neural Network (CNN) to detect objects in images, but this is a computationally intensive task. Each pass of a detection or inference algorithm may take billions of operations. Although one-stage object detection methods that have been developed in recent years have shown a promising accuracy, with a significant reduction in complexity compared to two-stage approaches, the complexity is still very high, and real-time operation with a high accuracy can only be achieved using a specialized Graphics Processing Unit (GPU).

By contrast, tracking a previously detected object, from one video frame to another, can be a relatively low complexity operation. There are existing single-object trackers running at hundreds of frames per second (fps) using a generic Central Processing Unit with a convincing tracking result. However, tracking many objects at a time can actually be less efficient than performing object detection.

The document "Detect or Track: Towards Cost-Effective Video Object Detection/Tracking", Luo, Hao, Wenxuan Xie, Xinggang Wang, and Wenjun Zeng, ArXiv:1811.05340 [cs.CV], Nov. 13, 2018, discloses a system in which a scheduler makes a decision for each incoming frame whether to use detection or tracking, and the frames are processed accordingly. In the prior art system, a Siamese network is used for tracking multiple objects, and the decision whether to use tracking or detection for a new frame is made based on the output of a scheduler network, which in turn based on the output of the Siamese networks. The scheduler is trained using reinforcement learning.

SUMMARY

According to an aspect of the invention, there is provided a method of detecting objects in a video, the method comprising, for each image in the video:
 determining a degree of correlation between the image and at least one preceding image in a sequence of images;
 obtaining a first measure of energy consumption required for performing an object detection process on the image, obtaining a second measure of energy consumption required for performing an object tracking process for tracking at least one object from a previous image, and comparing the first and second measures of energy; and performing the object detection process on the image if either said degree of correlation is below a threshold level or said first measure of energy is lower than the second measure of energy, or performing the object tracking process on the image otherwise.

The method may comprise performing the object detection process using a neural network.

The method may comprise performing the object detection process using a one stage object detector, or may comprise performing the object detection process using a multi-stage object detector.

The method may comprise obtaining the first measure of energy consumption based on a predetermined power consumption of the neural network.

The method may comprise performing the object tracking using a single object tracker.

The method may comprise obtaining the first measure of energy consumption based on information about a device to be used for performing the object detection process.

The method may comprise obtaining the second measure of energy consumption based on information about a device to be used for the tracking.

The method may comprise obtaining the second measure of energy consumption based on a number of tracked objects and their sizes.

The method may comprise obtaining the second measure of energy consumption using a regression function obtained from previous measurements of energy consumption.

The method may comprise performing the object detection process or the object tracking process in the compressed domain.

The method may comprise performing data association to compute a tracklet for each detected object.

The method may comprise determining the degree of correlation between the image and at least one preceding image by:
 determining a first number of matched features in a previous image;
 determining a second number of matched features in the current image; and
 determining the degree of correlation based on a difference between the first number of matched features and the second number of matched features.

The first number of features may be an average of a respective number of features in each of a plurality of preceding images.

The method may comprise determining the degree of correlation between the image and the at least one preceding image based on features extracted from the images.

The method may comprise extracting the features by:
 extracting features from a full image; or
 extracting features from a down-sampled image; or
 separating the image into blocks, and extracting respective features from each block of the image.

The method may further comprise determining the degree of correlation between the image and at least one preceding image by using additional sensor outputs and/or by using features from compressed video.

According to a further aspect, there is provided a computer program product, comprising code for causing a programmed processor to perform a method according to the first aspect.

According to a further aspect, there is provided a video analysis processing device, comprising:
 an input for receiving a video; and
 a processor, the processor being configured to perform a method comprising, for each image in the video:
 determining a degree of correlation between the image and at least one preceding image in a sequence of images;
 obtaining a first measure of energy consumption required for performing an object detection process on the image, obtaining a second measure of energy consumption required for performing an object tracking process for tracking at least one object from a previous image, and comparing the first and second measures of energy; and performing the object detection process on the image if either said degree of correlation is below a threshold level or said first measure of energy is lower than the second measure of energy, or performing the object tracking process on the image otherwise.

According to a further aspect, there is provided a video analysis device comprising an image analysis processing device according to the previous aspect, and further comprising a camera.

The disclosed embodiments can improve the energy consumption of the object detection, by determining whether to use object detection or object tracking at each stage, and taking account of the energy consumption in making the determination. The process can be efficient from the point of view of energy consumption, while maintaining the detection accuracy, and also being fast enough to be performed in real time.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
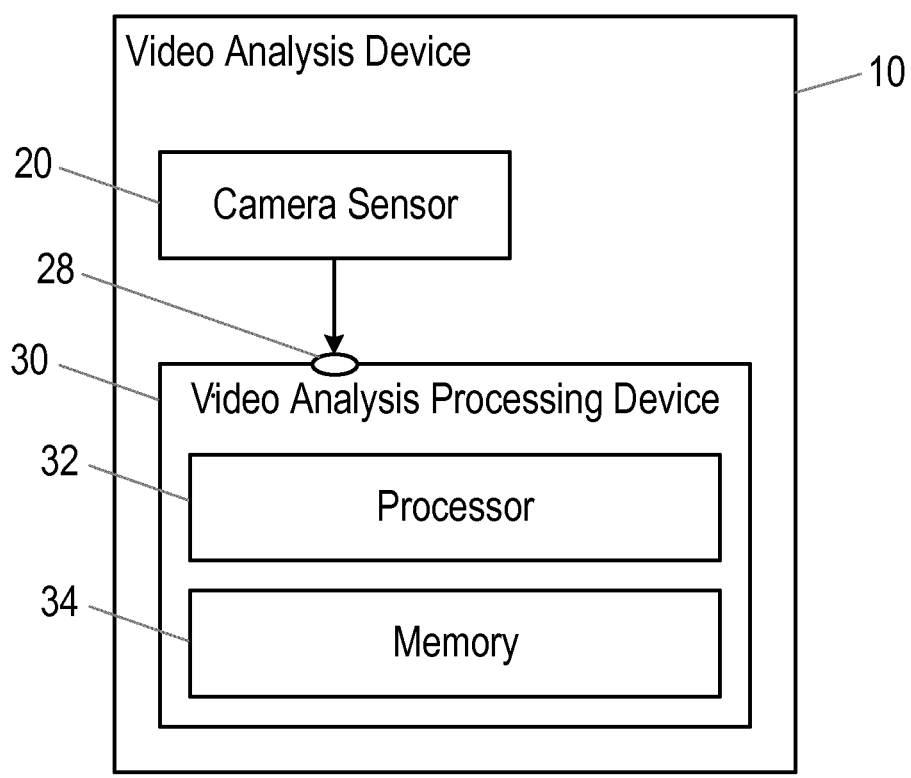
FIG. 1 is a block diagram, illustrating the main functional components of a device configured for video analysis.

FIG. 1 is a block diagram, illustrating the main functional components of a video analysis device 10.

In this embodiment, the video analysis device 10 includes a camera sensor 20, which acts as a source of video images. However, the video analysis device 10 may operate on video images received from outside the video analysis device.

Video images received from the source are passed to the input 28 of a video analysis processing device 30, in the form of a data processing and control unit, which comprises a processor 32 and a memory 34.

The processor 32 controls the operation of the video analysis processing device 30, and/or the video analysis device 10. The processor 32 may comprise one or more microprocessors, hardware, firmware, or a combination thereof. In particular, as described in more detail below, the processor 32 may be configured to operate as a neural network.

The memory 34 may comprise both volatile and non-volatile memory for storing computer program code and data needed by the processor 32 for operation.

The memory 34 may comprise any tangible, non-transitory computer-readable storage medium for storing data including electronic, magnetic, optical, electromagnetic, or semiconductor data storage. The memory 34 stores at least one computer program comprising executable instructions that configure the processor 32 to implement the methods and procedures described herein. In general, computer program instructions and configuration information are stored in a non-volatile memory, such as a read only memory (ROM), erasable programmable read only memory (EPROM) or flash memory.

Temporary data generated during operation may be stored in a volatile memory, such as a random access memory (RAM). In some embodiments, a computer program for configuring the processor 32 as herein described may be stored in a removable memory, such as a portable compact disc, portable digital video disc, or other removable media. The computer program may also be embodied in a carrier such as an electronic signal, optical signal, radio signal, or computer readable storage medium.

The video analysis device 10 may be incorporated in any type of device, with additional functionality, which need not be described in detail here. In general, the method is of particular use in devices with restricted computational capacity and/or restricted power sources. For example, the video analysis device may be incorporated into a smartphone, in which case it will include conventional features of a smartphone, for example user interface features such as a touchscreen, microphone(s) and loudspeaker(s), and communications features such as an antenna, RF transceiver circuitry, etc. The method is then particularly useful when the device is operating in a low-power mode. As another example, the video analysis device 10 may be incorporated into an Internet of Things (IoT) device, operating with severe power constraints.

Figure 2:
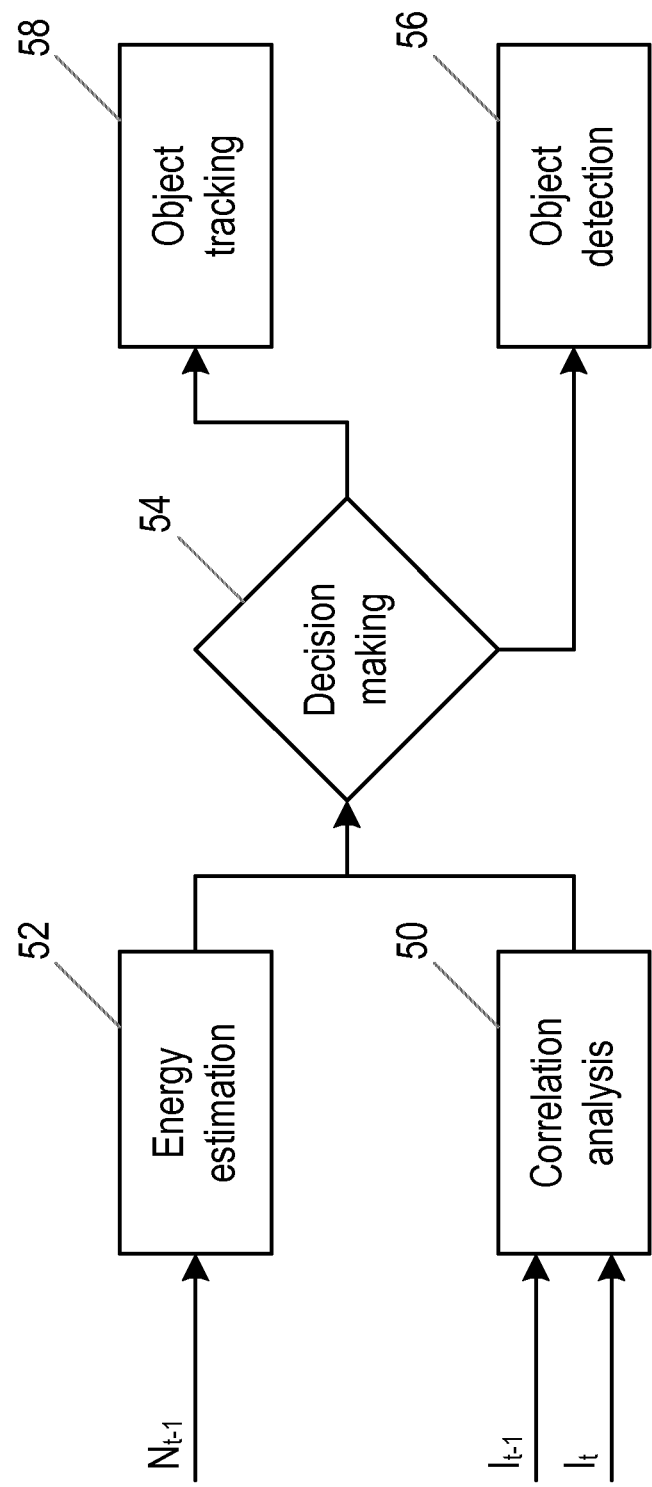
FIG. 2 shows schematically the operation of a method for detecting objects.

FIG. 2 shows schematically the operation of a method for detecting objects in the video analysis device 10.

Specifically, as shown at block 50, the video analysis device 10 generates information relating to a degree of correlation between a current image $I_t$ and at least one preceding image $I_{t-1}$ in a sequence of images. At block 52, the video analysis device 10 obtains a first measure of energy consumption required for performing an object detection process on the image, and obtains a second measure of energy consumption required for performing an object tracking process for tracking at least one object from a previous image, with the latter being based on the number of objects $N_{t-1}$ and the size of the areas to be tracked in the previous frame.

At block 54, the video analysis device compares the first and second measures of energy and determines that the object detection process 56 should be performed on the image if either said degree of correlation is below a threshold level, or said first measure of energy is lower than the second measure of energy, or that the object tracking process 58 should be performed on the image otherwise.

Figure 3:
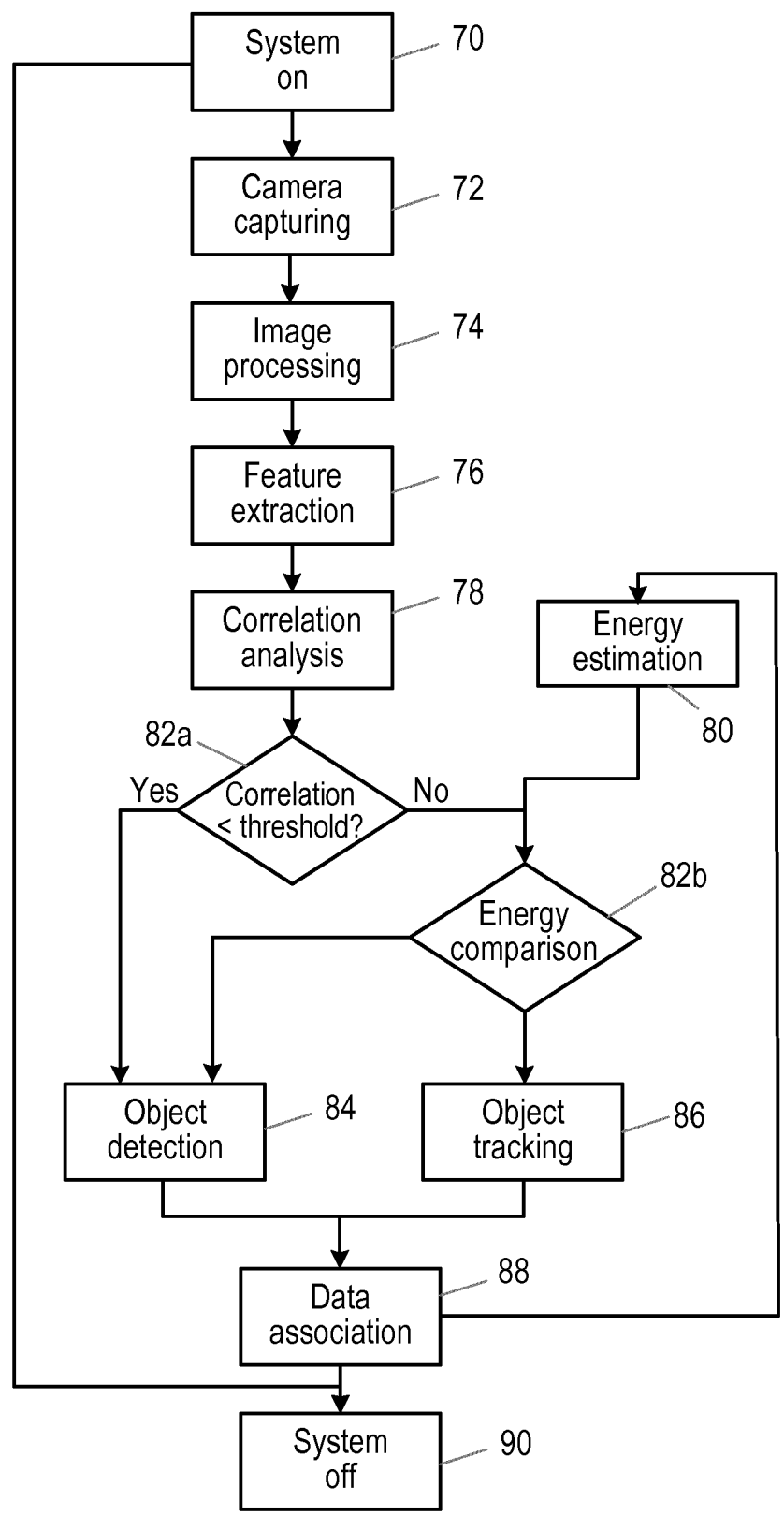
FIG. 3 is a flow chart illustrating one embodiment of a method in accordance with the disclosure.

FIG. 3 is a more detailed flow chart, illustrating the method of detecting objects that is performed.

The method begins at step 70, when the system is started.

At step 72, a sequence of images is obtained. In a device 10 as shown in FIG. 1, the sequence of images comprises a sequence of video frames obtained from the camera sensor 20.

For the first frame in a sequence, an object detection process is executed, as described in more detail below. The steps of the method are then used on each successive image or frame of the sequence.

In step 74, image processing may be performed.

In one embodiment, selected image processing steps from an image signal processor (ISP) are applied to the image. For example, image processing steps such as demosaicing of the raw image may be performed, and/or contrast enhancement may be applied.

In step 76, image feature points are extracted from the image. For example, each image may first be down-sampled (for example to a resolution of 300 by 300 pixels). The features may be extracted by using the Oriented FAST and rotated BRIEF (ORB) feature detector. Other feature extraction algorithms can also be used for feature extraction, such as the Scale-invariant feature transform (SIFT), or the Speeded up robust features (SURF) feature detector. If the received video is in compressed format, it may need to be partially decompressed in order to allow the features to be extracted.

In step 78, a degree of correlation is determined between the image and at least one preceding image in a sequence of images.

For example, the frame correlation analysis may involve analyzing a correlation between frames based on the deviation of number of matched feature points between the current frame and a previous frame.

The number of matched points is obtained by matching the current frame to the previous frame in feature space.

For example, if the number of matched feature points for the $i^{th}$ video frame is denoted as $N_i$, the moving average of $N_1$ is calculated as $N_{avg}$. Furthermore, a deviation value $d_i$ is calculated for each frame as $d_i = abs(N_i - N_{avg})$. The moving average $d_{avg}$ of the deviation is calculated as an exponential average, for example $d_{avg} = 0.9 * d_{avg} + 0.1 * d_i$.

Then, if $d_i > \rho d_{avg}$, where the parameter $\rho$ is a factor to adjust the sensitivity of the calculation, and in one embodiment is assigned the value 2.7, this is taken as an indication that there has been a significant change in the image sequence, for example a change of scene, and that a new object detection process needs to be performed.

In the embodiment described above, the correlation analysis operates by considering the correlation, that is, the number of matching points, across the entire image. In alternative embodiments, this global point matching is replaced by a process of considering matching per image segments, such as blocks.

Thus, the image is divided into segments, and in step 76 the number of matched feature points is computed for each segment, and counted for the entire image. Then, in step 78, a calculation similar to that described above can be performed.

This calculation with a big block can accelerate the computation. The size of the block needs to be selected carefully, since with big enough blocks and small objects on the scene then extracting and matching key-points might return wrong associations.

The correlation analysis may further comprise determining a degree of correlation by using outputs from additional sensors, such as depth cameras, dynamic vision sensors, inertial sensors, etc., and by using encoded features from the compressed videos, e.g., motion vectors. This additional information can be used to more precisely determine the degree of correlation. For example, if an inertial measurement unit on the device detects sudden movement, this can be used to determine that low correlation between images can be expected.

The correlation analysis algorithm should be lightweight, and its implementation should be efficient, that is, the complexity of the correlation analysis should be very much less than that of the object detection, in order to minimize the overhead energy usage.

In step 80, a first measure or estimate of the energy consumption required for performing an object detection process on the image is obtained, and a second measure or estimate of the energy consumption required for performing an object tracking process for tracking at least one object from a previous image is obtained. These energy consumption measures or estimates are obtained from information about the preceding image.

For example, the first measure of energy consumption may be obtained based on information about a hardware device that is to be used for performing the object detection process. The information can be obtained in advance by measuring the energy consumption of the device during a trial detection process. In addition, or alternatively, the first measure of energy consumption may be obtained based on information about the computational complexity of the object detection process that is to be used. For example, if the object detection process is to be performed using a neural network, the first measure of energy consumption can be obtained based on a predetermined power consumption of the neural network.

The second measure of energy consumption may be calculated as a summation of the energy for all tracked objects, on the assumption that objects are tracked individually. In another embodiment, where the tracker used is a Kernelized Correlation Filter (KCF), the energy consumption of each tracked object is related to the size m*n of the tracked box, and could be fitted to a polynomial/regression function. In addition, or alternatively, the second measure of energy consumption may be obtained based on information about a hardware device that is to be used for performing the object tracking process.

Thus, for example, a specific hardware device can be used for tracking pixels on a number of occasions. The energy consumption (y) can for example be assumed to be related to the number of tracked pixels (x) by means of a polynomial function, such as:

$$y = bx^2 + cx + d,$$

and suitable values for b, c, and d can then be obtained using a least squares method to fit the function to the values obtained on those occasions.

An estimate for the energy consumption can then be obtained on future occasions when the number of pixels to be tracked has been determined.

In one embodiment, the energy consumption estimations for tracking and detection may both be generated by measuring the energy usage on the device over a number of tracking and detection iterations. Based on the measured energy usage, together with information about the correlation between frames as determined in step 78, a regression function as described above can be obtained for the actual energy consumption on the device, and used to derive subsequent energy consumption estimations.

The process then proceeds to step 82a, where a first part of the decision is made as to whether to perform an object detection process or an object tracking process on the current image.

If the degree of correlation obtained in step 78 is below a threshold value, which is selected based on the degree of correlation that is required in order to be confident that an object tracking process will be successful, then it is determined that an object detection process should be performed, and the method passes to step 84.

If the degree of correlation obtained in step 78 is above the threshold value, that is, it is determined that the object tracking process would be able to detect the objects present in the image, the process passes to step 82b, in which the first measure or estimate of the energy consumption required for performing an object detection process on the image is compared with the second measure or estimate of the energy consumption required for performing an object tracking process. If it is determined that the estimated energy consumption of the detection process is smaller than the estimated energy consumption of the tracking process, then it is determined that an object detection process should be performed and the method passes to step 84, even if the degree of correlation obtained in step 78 is above the threshold value, implying that an object tracking process would be successful, that is, that the object tracking process would have been able to detect the objects present in the image.

If the degree of correlation obtained in step 78 is above the threshold value, and it is determined that the estimated energy consumption of the detection process is larger than the estimated energy consumption of the tracking process, then it is determined that an object tracking process should be performed and the method passes to step 86.

In this illustrated embodiment, the energy estimations are made in all cases, but they are compared in step 82*b* only if the degree of correlation exceeds the threshold value. In other embodiments, the energy estimations are only made, and subsequently compared, if the degree of correlation exceeds the threshold value. In other embodiments, the energy estimations are made and compared in all cases, but the result of the comparison is only relevant if the degree of correlation exceeds the threshold value.

As mentioned above, in step 84, an object detection process is performed.

The object detection process may use a neural network. The object detection process may be a one stage object detector such as a Single Shot Detector (SSD), for example MobileNet-SSD, or a Deeply Supervised Object Detector (DSOD), for example Tiny-DSOD. Alternatively, the object detection process may be a two stage object detector or multi-stage object detector.

In order to perform object detection on images in the compressed domain, the compressed video bit stream is partially decompressed, and the object detection is performed by using the prediction mode, block splitting information, and DCT coefficients, etc. as the input format to the neural network.

As mentioned above, in step 86, an object tracking process is performed.

In some embodiments, the object tracking process uses a single object tracker, although in other embodiments a multi-object tracker may be used. A low complexity object tracking algorithm may be used. For example, one suitable object tracking algorithm uses Kernelized Correlation Filters, as described in "High-Speed Tracking with Kernelized Correlation Filters", Henriques, Joao F., Rui Caseiro, Pedro Martins, and Jorge Batista, IEEE Transactions on Pattern Analysis and Machine Intelligence 37, no. 3 (Mar. 1, 2015): 583-96.

In some embodiments, the features extracted in step 76 of the method, as described above, can be reused for the object tracking.

In one embodiment, object tracking is performed in the compressed video domain.

In order to perform object tracking on images in the compressed domain, the compressed video bit stream is partially decompressed, and the object tracking is based on the extracted motion vectors from the video codecs by using methods such as spatio-temporal Markov random fields.

After the object detection process in step 84 or the object tracking process in step 86 has been performed, the method may proceed to step 88, in which data association may be performed for the object detection and tracking results. This step is generally skipped for object detection operation only. However, this module can be enabled to provide the system a possibility to compute a tracklet (i.e. a fragment of the track followed by a moving object) for each object.

The data association process may use the Hungarian algorithm to create the trajectory of the tracked objects.

The method described above is then performed until the images of the video have all been processed, and the method then proceeds to step 90, where it terminates.

There is thus described a method for performing object detection, by determining when to track and when to detect in a sequence of video frames, that can be performed in an efficient manner, and could therefore reduce the energy consumption of devices.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of detecting objects in a video, the method comprising, for each image in a sequence of images of the video:
   determining a degree of correlation between the image and at least one preceding image in the sequence of images based on a correlation between frames based on a deviation of a number of matched features between the image and the at least one preceding image;
   obtaining a first measure of energy consumption required for performing an object detection process on the image, obtaining a second measure of energy consumption required for performing an object tracking process for tracking at least one object from a previous image;
   when the degree of correlation is below a threshold value, performing an object detection process on the image;
   when the degree of correlation is above a threshold value, comparing the first measure of energy and the second measure of energy and performing the object detection process on the image if
      the first measure of energy consumption is lower than the second measure of energy consumption; and
   performing the object tracking process on the image if the first measure of energy consumption is larger than the second measure of energy consumption.

2. The method according to claim 1, comprising performing the object detection process using a neural network.

3. The method according to claim 2, comprising performing the object detection process using a one stage object detector.

4. The method according to claim 2, comprising performing the object detection process using a multi-stage object detector.

5. The method according to claim 2, comprising obtaining the first measure of energy consumption based on a predetermined power consumption of the neural network.

6. The method according to claim 1, comprising performing the object tracking using a single object tracker.

7. The method according to claim 1, comprising obtaining the first measure of energy consumption based on information about a device to be used for performing the object detection process.

8. The method according to claim 1, comprising obtaining the second measure of energy consumption based on information about a device to be used for the tracking.

9. The method according to claim 1, comprising obtaining the second measure of energy consumption based on a number of tracked objects and their sizes.

10. The method according to claim 9, comprising obtaining the second measure of energy consumption using a regression function obtained from previous measurements of energy consumption.

11. The method according to claim 1, comprising performing the object detection process or the object tracking process in the compressed domain.

12. The method according to claim 1, comprising performing data association to compute a tracklet for each detected object.

13. The method according to claim 1, comprising determining the degree of correlation between the image and the at least one preceding image by:
   determining the number of matched features in the at least one preceding image;
   determining the number of matched features in the image; and
   determining the degree of correlation based on the difference between the number of matched features in the at least one preceding image and the number of matched features in the image.

14. The method according to claim 13, wherein the number of features in the at least one preceding image is an average of a respective number of features in each of a plurality of preceding images.

15. The method according to claim 1, comprising determining the degree of correlation between the image and the at least one preceding image based on features extracted from the images.

16. The method according to claim 15, comprising extracting the features by:
   extracting features from a full image.

17. The method according to claim 15, comprising extracting the features by:
   extracting features from a down-sampled image.

18. The method according to claim 15, comprising extracting the features by:
   separating the image into blocks, and extracting respective features from each block of the image.

19. The method according to claim 1, further comprising determining the degree of correlation between the image and the at least one preceding image by using additional sensor outputs and/or by using features from compressed video.

20. A video analysis processing device, comprising:
   an input for receiving a video; and
   a processor, the processor being configured to perform a method comprising, for each image in a sequence of images of the video:
      determining a degree of correlation between the image and at least one preceding image in the sequence of images based on a correlation between frames based on a deviation of a number of matched features of the image and a number of matched features between the image and the at least one preceding image;
      obtaining a first measure of energy consumption required for performing an object detection process on the image, obtaining a second measure of energy consumption required for performing an object tracking process for tracking at least one object from a previous image;
   when the degree of correlation is below a threshold value, performing an object detection process on the image;
   when the degree of correlation is above a threshold value, comparing the first measure of energy and the second measure of energy and performing the object detection process on the image if
      the first measure of energy consumption is lower than the second measure of energy consumption; and
   performing the object tracking process on the image if the first measure of energy consumption is larger than the second measure of energy consumption.

21. A video analysis device comprising:
a camera for capturing a video
an image analysis processing device comprising:
   an input for receiving the video; and
   a processor, the processor being configured to perform a method comprising, for each image in a sequence of images of the video:
      determining a degree of correlation between the image and at least one preceding image in the sequence of images based on a correlation between frames based on a deviation of a number of matched features between the image and the at least one preceding image;
      obtaining a first measure of energy consumption required for performing an object detection process on the image, obtaining a second measure of energy consumption required for performing an object tracking process for tracking at least one object from a previous image;
      when the degree of correlation is below a threshold value, performing an object detection process on the image;
      when the degree of correlation is above a threshold value, comparing the first measure of energy and the second measure of energy and performing the object detection process on the image if
         the first measure of energy consumption is lower than the second measure of energy consumption; and
      performing the object tracking process on the image if the first measure of energy consumption is larger than the second measure of energy consumption.

* * * * *